United States Patent [19]

Anderson et al.

[11] Patent Number: 5,002,347
[45] Date of Patent: Mar. 26, 1991

[54] STEPPED THICKNESS SPECTRAL FILTER FOR FOCAL PLANE FLATTENING

[75] Inventors: Neal R. Anderson; James C. Peterson, both of Mesa, Ariz.

[73] Assignee: Motorola, Inc., Schaumburg, Ill.

[21] Appl. No.: 398,570

[22] Filed: Aug. 25, 1989

[51] Int. Cl.⁵ .............................................. F21V 9/06
[52] U.S. Cl. .................................. 350/1.4; 350/317; 350/451; 250/353
[58] Field of Search ................. 350/1.1, 1.2, 1.4, 451, 350/317; 250/349, 353; 102/213

[56] References Cited

U.S. PATENT DOCUMENTS 4,421,985 12/1983 Billingsley et al. ................. 250/353
4,804,249 2/1989 Reynolds et al. ................... 350/451
4,809,611 3/1989 Esplin ................................... 102/213

*Primary Examiner*—Bruce Y. Arnold
*Assistant Examiner*—J. P. Ryan
*Attorney, Agent, or Firm*—Jordan C. Powell; Frank J. Bogacz

[57] ABSTRACT

A spectral filter for use in optical systems receiving field-of-view (FOV) optical beams at differing angles refracts all FOV beams onto a single plane focal surface. The spectral filter comprises a combination of lens having varied thicknesses incorporated into a single filter unit. Each thickness, or step, of the spectral filter corresponds to a different one of the received FOV beams.

8 Claims, 3 Drawing Sheets

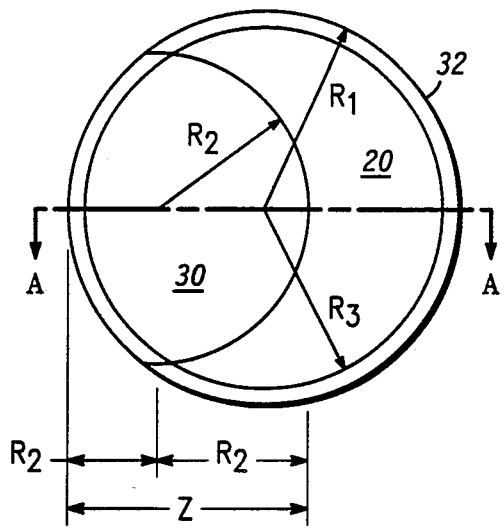
FIG. 3
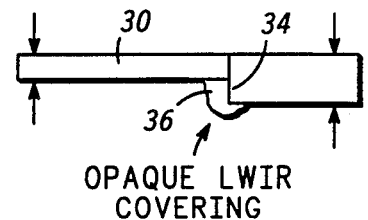
CROSS-SECTION A-A
FIG. 4
FIG. 6
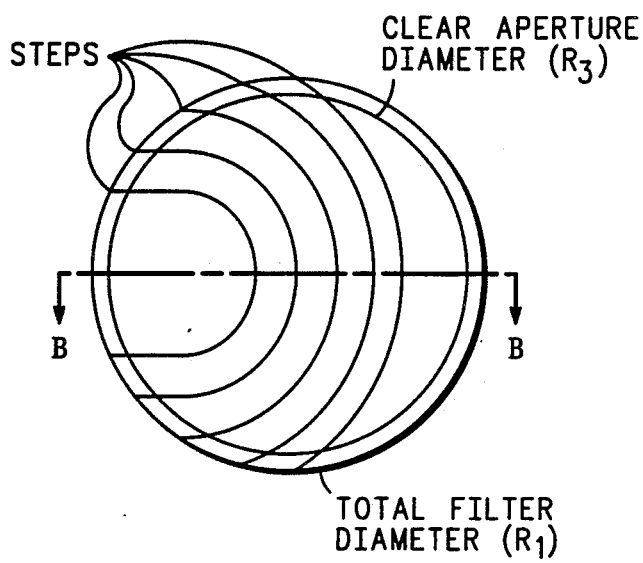
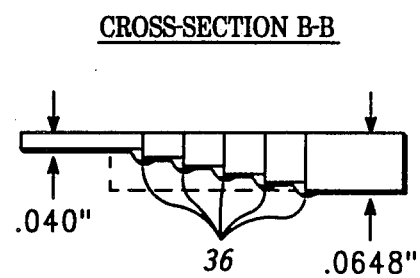
CROSS-SECTION B-B
FIG. 7

STEPPED THICKNESS SPECTRAL FILTER FOR FOCAL PLANE FLATTENING

BACKGROUND OF THE INVENTION

This invention relates, in general, to optical sensors, and more specifically, to passive multi-conical beam optical detecting systems.

Long-wavelength-infrared (LWIR) passive optical systems for conical beam target detection, such as the system described in U.S. Pat. No. 4,809,611 issued Mar. 7, 1989 to Roy Esplin, result in curved focal surfaces. To obtain an optical conical field-of-view (FOV) from the curved focal surfaces, annular-ring-detector-arrays (ARDA) are placed at the focal surface of such optical systems. The ARDA are then positioned and sized to achieve the desired cone geometry. For a 360 degree azimuthal conical FOV, the ARDA requires four (4) optical system quadrants, each with near 90 degree FOV arcs, as described in the '611 patent.

When a passive sensor requires two or more conical FOV, the ARDAs for each FOV must be added to the focal surface in separate planes. Since detector arrays can only be grown on flat wafer surfaces, each ARDA must be fabricated in separate areas on the wafer substrate and cut from the wafer. The ARDAs are then each individually positioned in a precise manner at the focal surface of the optical system. This process is costly and time consuming, and does not lend itself well to large scale production techniques. Ideally, all ARDA required for a 360 azimuth could be placed on a single wafer.

SUMMARY OF THE INVENTION

Accordingly, it is an object of the present invention to provide a passive infrared optical device which effectively flattens the focal surface of the optical systems's wide angle lens.

Another object of the present invention is to provide a passive infrared optical device which allows all ARDA to be grown on a single flat wafer surface.

A further object of the present invention is to provide a means for allowing one-step positioning of all detector arrays at the flat focal surface of optical systems.

A spectral filter for use in optical systems receiving field-of-view (FOV) optical beams at differing angles refracts all FOV beams onto a single plane focal surface. The spectral filter comprises a combination of lens having varied thicknesses incorporated into a single filter unit. Each thickness, or step, of the spectral filter corresponds to a different one of the received FOV beams.

The above and other objects, features, and advantages of the present invention will be better understood from the following detailed description taken in conjunction with the accompanying drawings.

BRIEF DESCRIPTION OF THE DRAWING

FIG. 3 is a front view of the present invention.

FIG. 4 is a cross-sectional view of the present invention along line A—A of FIG. 3.

FIG. 6 is a front view of the embodiment of FIG. 5.

FIG. 7 is a cross-sectional view along line B—B of FIG. 6.

DETAILED DESCRIPTION OF THE INVENTION

The present invention is designed for use in any system which employs passive sensors having two or more conical beam field-of-views (FOV) and incorporates optical systems similar to the system described in U.S. Pat. No. 4,809,611. The teachings of multi-conical beam FOV systems of the '611 patent, issued Mar. 7, 1989 Roy W. Esplin, having the same assignee as the present invention, are hereby incorporated by reference. The present invention may also be used in other optical systems such as near infrared, visible, etc.

Figure 1:
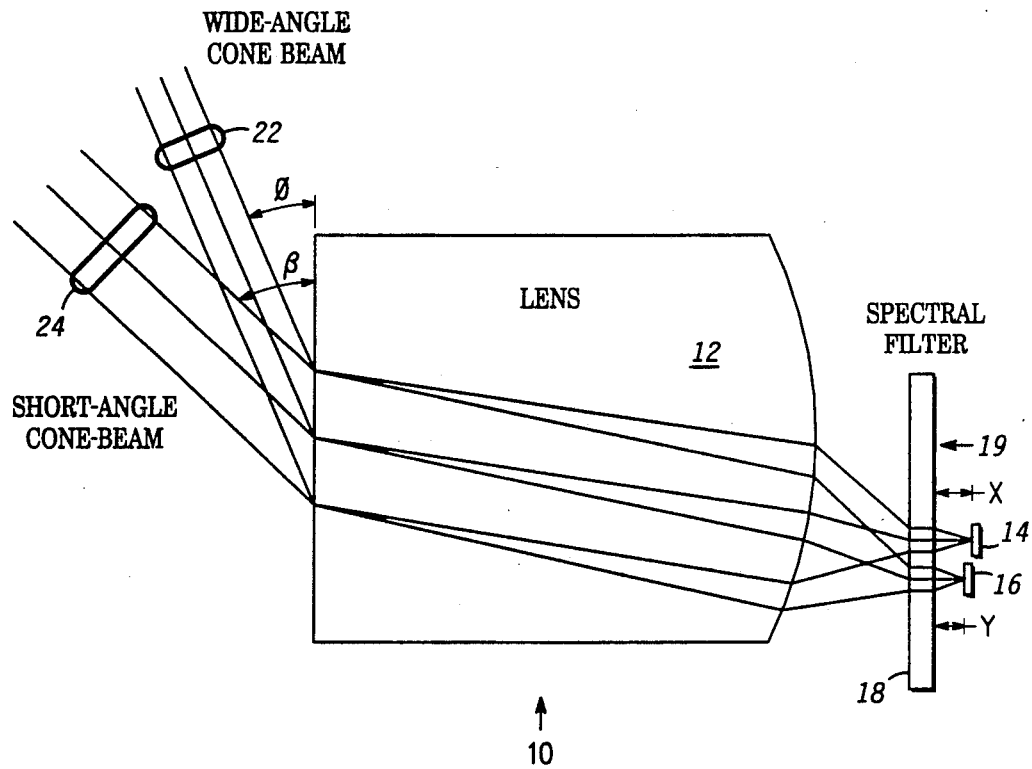
FIG. 1 is a diagram of a passive infrared optical system for multibeam conical optics detecting system as described in U.S. Pat. No. 4,809,611.

FIG. 1 shows an optical system 10 similar to the optical system described in the '611 patent. Specifically, optical system 10 includes a wide-angle lens 12, a first and second annular-ring-detector-array (ARDA) 14 and 16 corresponding to short angle and wide angle conical beams respectively, and spectral filter 18. Wide-angle lens 12 and ARDA 14 and 16, as well as their interaction and operation, were described in '611. Spectral filter 18 will be recognized by one skilled in the art as an interference optical filter, or band-pass filter. Spectral filter 18 is placed near wide-angle lens 12 to reduce optical background noise and clutter.

A wide angle conical beam 22 intersects wide angle lens 12 at an angle $\phi$. Due to angle $\phi$, wide angle conical beam 22 refracts through wide angle lens 12 and through spectral filter 18 such that the focal surface of beam 22 is at a distance Y from face 19 of spectral filter 18. Similarly, a short angle conical beam 24 intersects wide angle lens 12 at an angle $\beta$. Beam 24 refracts through wide angle lens 12 and through spectral filter 18 such that the focal surface of beam 24 is at a distance X from face 19 of spectral filter 18 (the distances X and Y are distorted in FIG. 1 for illustrative purposes). ARDAs 14 and 16 are placed at the focal surfaces of short angle conical beam 22 and wide angle conical beam 24 respectively, placing ARDAs 14 and 16 in separate planes.

Detector arrays, such as ARDAs 14 and 16, can only be grown on flat wafer surfaces. The ARDA must be cut and separately placed in a precise manner at the focal surface. The process is very costly and time consuming, and does not apply well to large scale production.

Figure 2:
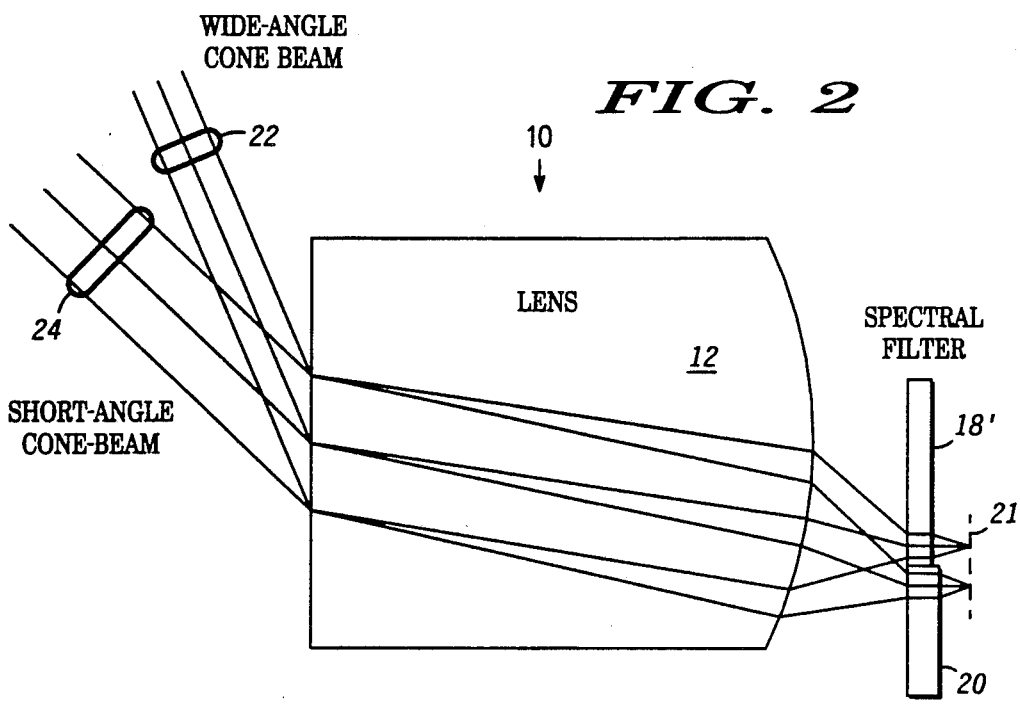
FIG. 2 is a diagram showing the preferred embodiment of the present invention combined with the optics system of the '611 patent of FIG. 1.

The present invention alters spectral filter 18 to align the ARDA of multi-conical beam FOV on a single, flat plane. Referring to FIG. 2, spectral filter 18' includes a region 20. Region 20 aligns the plane of the focal surface beam 24 with the focal surface plane of beam 22 (respresented by the dashed line labelled 21) by adding additional, predetermined refraction.

FIGS. 3 and 4 show the design of spectral filter 18' in its preferred embodiment when two conical FOV are received by optical system 10. FIG. 3 shows a face of spectral filter 18', whereas FIG. 4 shows a cross-section of spectral filter 18' along line A—A of FIG. 3.

Spectral filter 18', in FIG. 3, is a circular glass lens preferably comprised of Germaninum. The main body 30 of spectral filter 18' is a circular lens having a radius $R_1$. The thicknesses of region 20 and main body 30 vary in order to adjust the focal surfaces onto the same plane as shown in FIG. 4.

Referring again to FIG. 3, region 20 is a crescent shaped lens, which, if constructed in a complete circle, would have a radius of $R_1$. The inner portion of region 20 which appears to have been cut away from region 20, has a radius of $R_2$ with a centroid located between the $R_1$ centroid and the outermost edge of the otherwise circular shape. The total width Z of the cut-away portion is greater than $R_2$ but less than $2R_2$. The exact length of Z depends on the angle $\phi$ of wide angle conical beam 22 of FIG. 1. Main body 30 is cut in the exact manner as region 20. The portion of main body 30 resembling the cut-away section of region 20 is secured to region 20 to complete the circular appearance of spectral filter 18'. The positioning of the different width lens is designed to allow short angle conical beam 24 to pass through the thinner lens of main body 30, while wide angle conical beam 22 passes through the thicker lens of region 20.

Spectral filter 18' in FIG. 3 further comprises an opaque long-wavelength-infrared (LWIR) covering 32 around the outside edge of main body 30 at a radius of $R_3$ from the centroid of spectral filter 18'. LWIR covering 32 reduces the stray light reflections which may be refracted from the outside edge of spectral filter 18'.

The cross-section of spectral filter 18' in FIG. 4 shows that region 20 and main body 30 are fabricated from two separate lens into a single member in the preferred embodiment. The corner transition section 34 from region 20 to main body 30 is covered with an opaque LWIR covering 36. As with LWIR covering 32, LWIR covering 36 reduces stray light reflections which may occur at the corners. Although use of LWIR coverings 32 and 36 indicates that spectral filter 18' is designed for use LWIR wavelength sensors, spectral filter 18' may be used in sensors designed for other wavelengths such as near infrared, visible, etc. Appropriate coverings for these systems could be substituted for the LWIR material.

When all ARDA are on a single flat surface, a slight defocusing effect in the elevation direction occurs from the center of the ARDA outward since the ideal focal surface is curved. However, the defocusing effects are more severe for short angle conical beam 24 than for the wide angle conical beam 22. Therefore, since the required detector ring widths and ring-pair spacing of ARDA 16 (short angle) are larger than those for ARDA 14, the defocusing effect is negligible.

Figure 5:
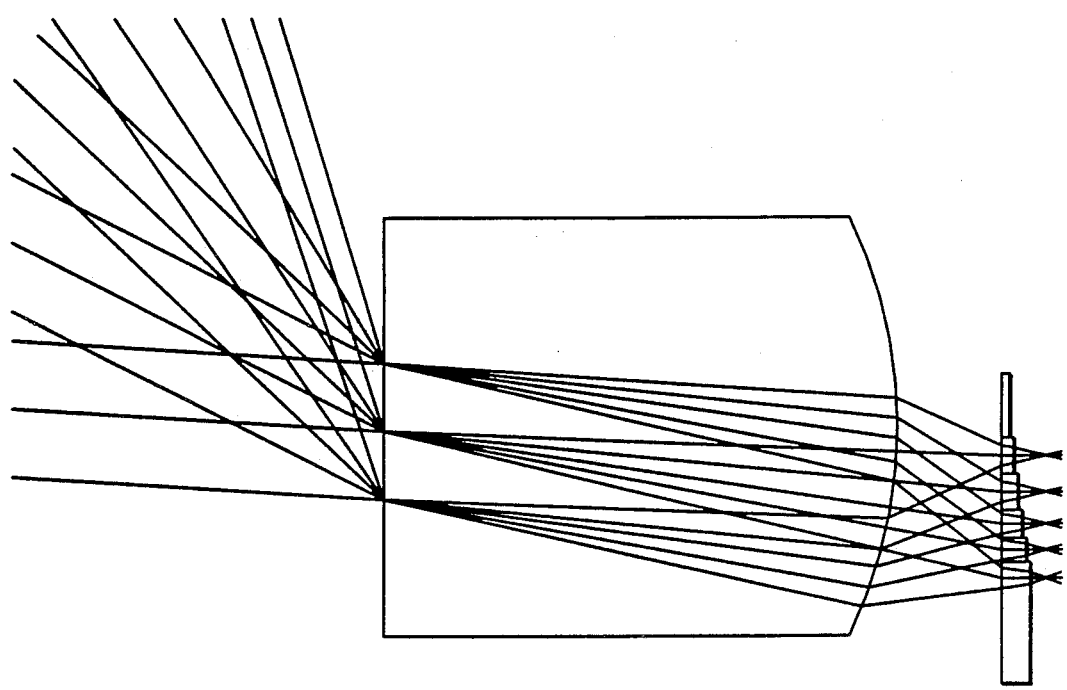
FIG. 5 is a diagram of the preferred embodiment of the present invention expanded to accommodate more than two 90 degree fields-of-view (FOV).

Spectral filter 18' may be designed to align the focal surfaces of several conical FOV beams, as shown in FIG. 5. The structure is similar with additional steps added to spectral filter 18' as further shown in FIGS. 6 and 7. A comparison of the thicknesses of spectral filter 18' in FIGS. 4 and 7 shows that the additional beams are oriented between wide-angle conical beam 22 and short-angle conical 24 in this particular embodiment. However, it should be recognized that various thicknesses, beam angles, and orientations are possible.

Referring to FIG. 6, each additional step has a different radius and varying length Z from the edge of spectral filter 18'. Furthermore, each corner transition is covered with LWIR covering 36.

Spectral filter 18' in FIGS. 3 and 7 has been described as comprising a series of thinner to thicker lens which are cut and secured together to form a single circular lens. Another mehtod of forming spectral filter 18' is forming main body 30 with radius $R_1$ and not cutting main body 30. Rather, additional lens cut in the determined fashion having thinner thicknesses are then secured onto main body 30. The resulting shape and operation are the same as the preferred embodiment. Thus there has been provided, in accordance with the present invention, a stepped spectral filter for focal plane flattening that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. A stepped spectral filter for focal plane flattening wherein the spectral filter is an element of an optical system for receiving conical field-of-view (FOV) beams, each beam having different intersecting angles to the optical system, the optical system comprising an optical lens and a plurality of annular-ring-detector-arrays oriented in a single plane parallel to the spectral filter, the spectral filter comprises:
   first spectral filter means for refracting a first FOV beam received from the optical lens to a first of the plurality of annular-ring-detector-arrays;
   second spectral filter means for refracting a second FOV beam received from the optical lens to a second of the plurality of annular-ring-detector-arrays; and
   said second spectral filter means fixedly secured to said first spectral filter means.

2. A stepped spectral filter according to claim 1 wherein said first spectral filter means comprises an optical lens.

3. A stepped spectral filter according to claim 1 wherein said second spectral filter means comprises an optical lens.

4. A stepped spectral filter according to claim 1 wherein said first spectral filter means comprises an optical lens and said second spectral filter means comprises an optical lens, said optical lens of said first spectral filter means having a different thickness than said optical lens of said second spectral filter means.

5. A stepped spectral filter for orienting the focal surfaces of multiple field-of-view (FOV) beams received by an optical system onto a single plane wherein the spectral filter comprises:
   first spectral filter means for refracting to the single plane a first received FOV beam having a first angle of intersection with respect to the optical system;
   second spectral filter means for refracting to the single plane a second received FOV beam having a second angle of intersection with respect to the optical system; and
   said second spectral filter means fixedly secured to said first spectral filter means.

6. A stepped spectral filter according to claim 5 wherein said first spectral filter means comprises an optical lens.

7. A stepped spectral filter according to claim 5 wherein said second spectral filter means comprises and optical lens.

8. A stepped spectral filter according to claim 5 wherein said first spectral filter means comprises an optical lens and said second spectral filter means comprises an optical lens, said optical lens of said first spectral filter means having a different thickness than said optical lens of said second spectral filter means.

* * * * *